United States Patent [19]

Chika

[11] 4,229,018
[45] Oct. 21, 1980

[54] TORSIONALLY RESILIENT STRUCTURE FOR A SIDECAR

[76] Inventor: John J. Chika, 1350 Orchard Ridge Rd., Bloomfield Hills, Mich. 48013

[21] Appl. No.: 857,566

[22] Filed: Dec. 5, 1977

Related U.S. Application Data

[63] Continuation-in-part of Ser. No. 437,482, Jan. 28, 1974, abandoned.

[51] Int. Cl.² .......................................... B62K 27/12
[52] U.S. Cl. .................................... 280/203; 296/205
[58] Field of Search ............... 280/203, 202, 209, 215, 280/282, 7.16, 96, 747, 750, 751, 752; 180/33 D, 33 R, 64 MM, 74; 296/28 J, 64, 63, 205; 188/5, 6

[56] References Cited

U.S. PATENT DOCUMENTS

| | | | |
|---|---|---|---|
| 1,478,316 | 12/1923 | Wood | 280/203 |
| 1,848,451 | 3/1932 | Wishart | 280/203 |
| 3,013,814 | 12/1961 | Becks | 280/203 |
| 3,768,834 | 10/1973 | Singleton | 280/209 |
| 3,794,352 | 2/1974 | Popp | 280/209 |

FOREIGN PATENT DOCUMENTS

| | | | |
|---|---|---|---|
| 182323 | 11/1954 | Austria | 280/203 |
| 812643 | 9/1951 | Fed. Rep. of Germany | 280/203 |
| 231326 | 4/1969 | U.S.S.R. | 280/203 |
| 553132 | 3/1977 | U.S.S.R. | 280/203 |

*Primary Examiner*—David M. Mitchell

[57] ABSTRACT

An apparatus of torsionally resilient sidecar structure and resilient structure for connecting it to any type of a two-wheel land vehicle, be it pedal-powered, motor-driven or any combination of propulsion; the sidecar operatively attachable to the two-wheel vehicle by a plurality of torsionally resilient connecting members, each of them bent to form a longer mid-portion and two shorter end-portions, the longer mid-portions positioned substantially horizontally and transversely between the frame of the two-wheel vehicle and the sidecar, thus determining the overall width of the combined vehicle, and their shorter end-portions operatively attached on one side to the structural members of the two-wheel vehicle and on the other side to the structural members of the sidecar assembly.

64 Claims, 36 Drawing Figures

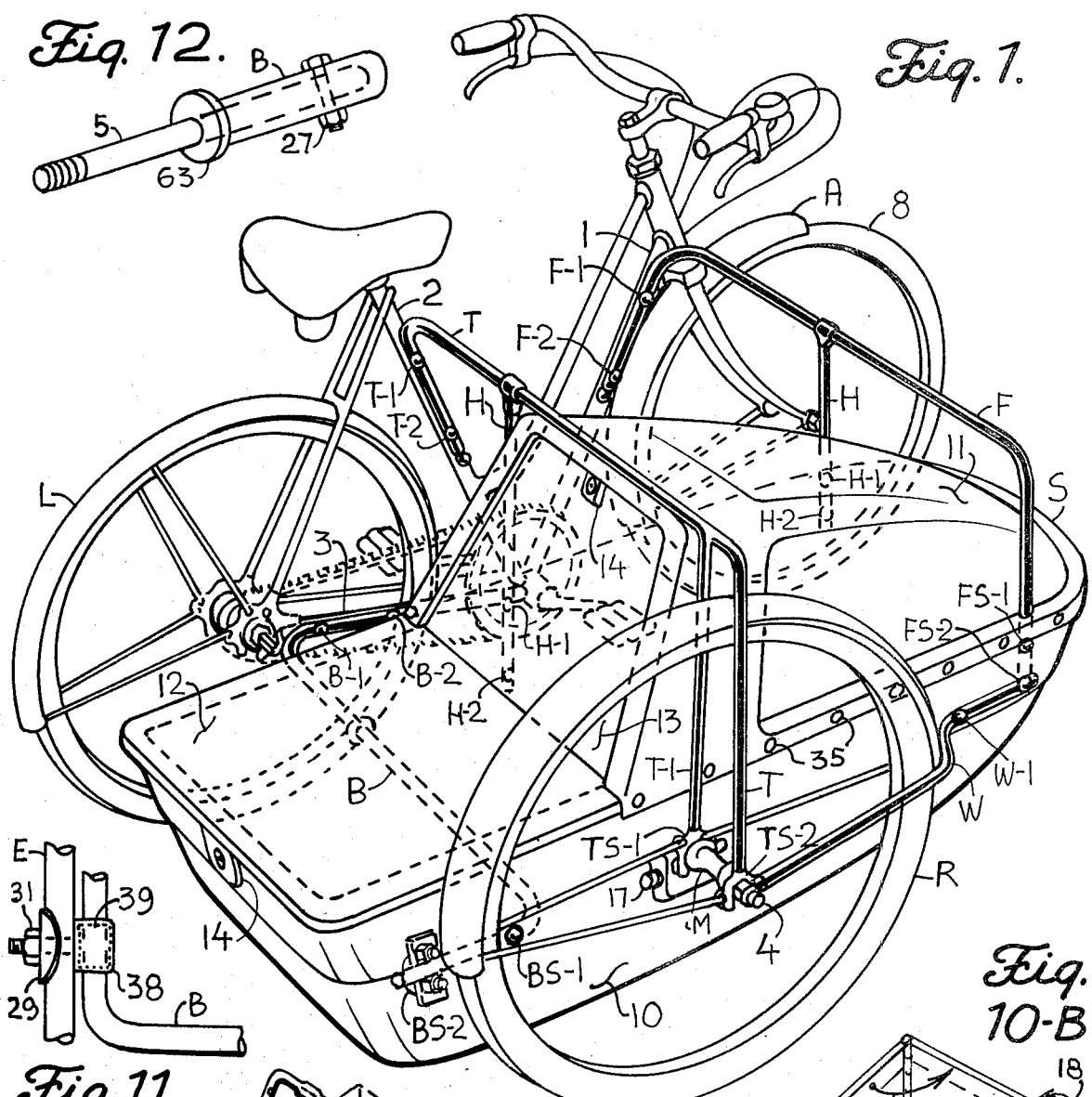
Fig. 1.
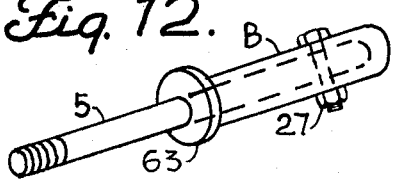
Fig. 12.
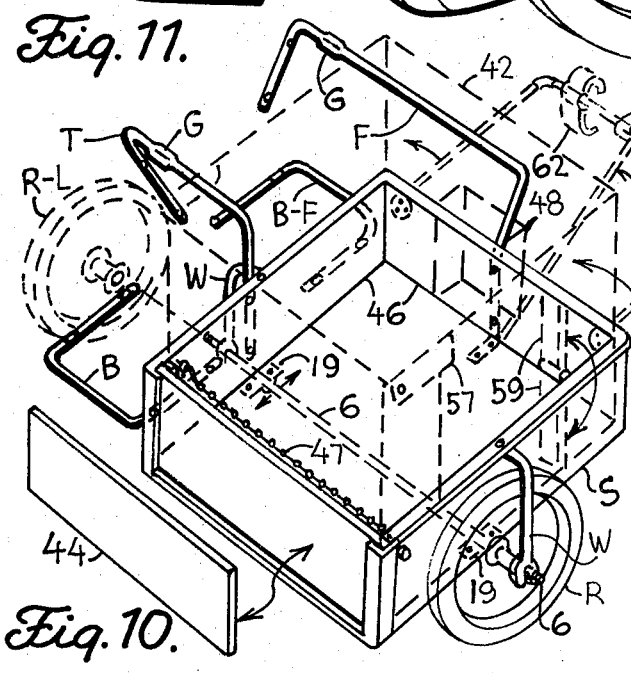
Fig. 11.
Fig. 10.
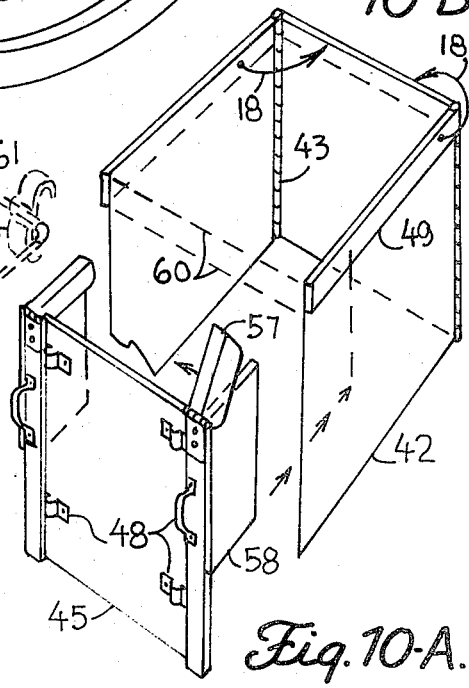
Fig. 10-A.
Fig. 10-B.

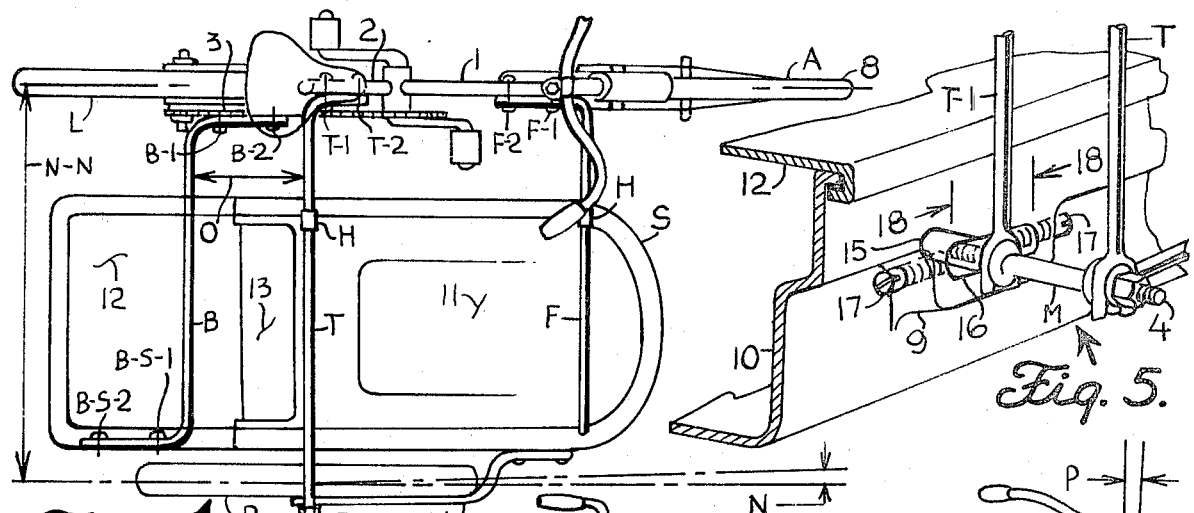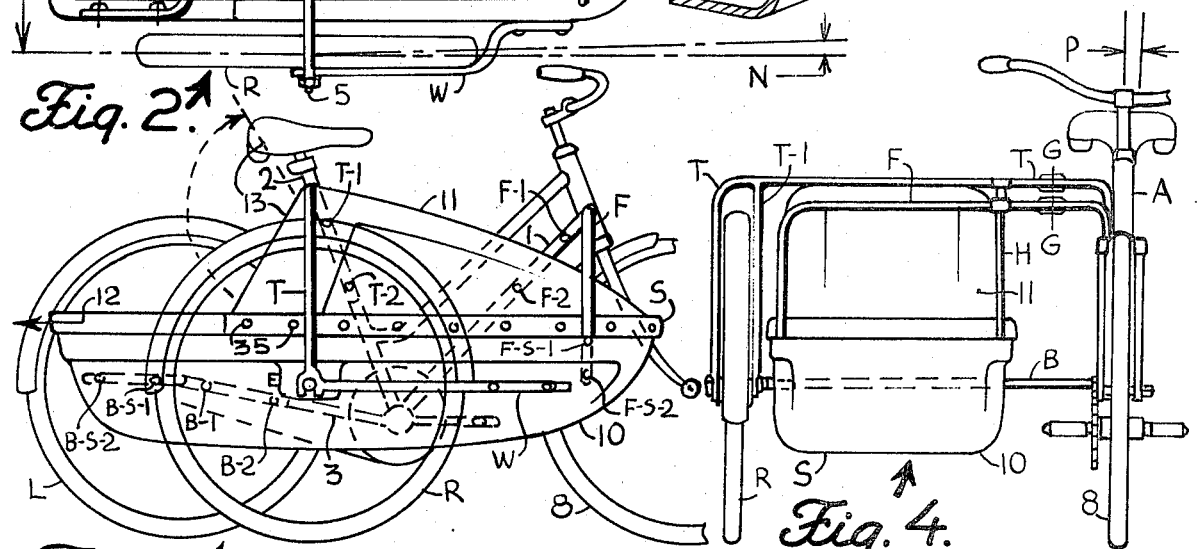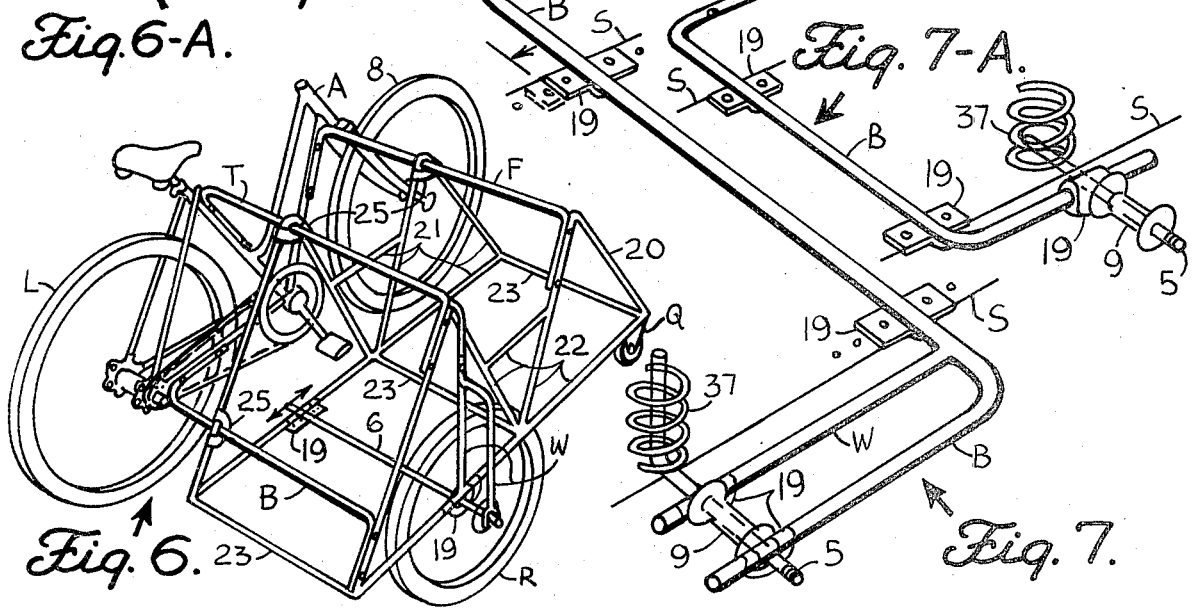

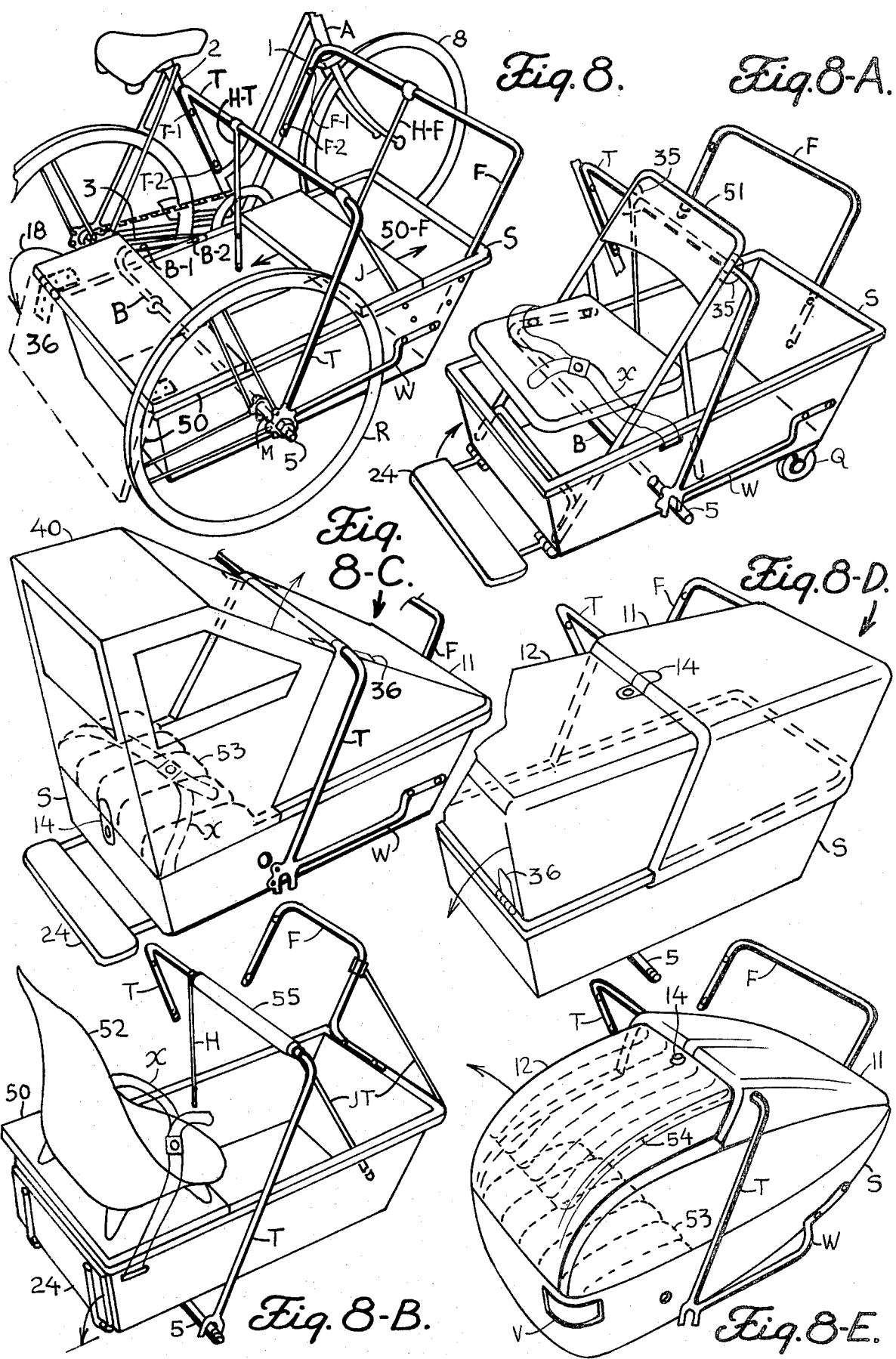

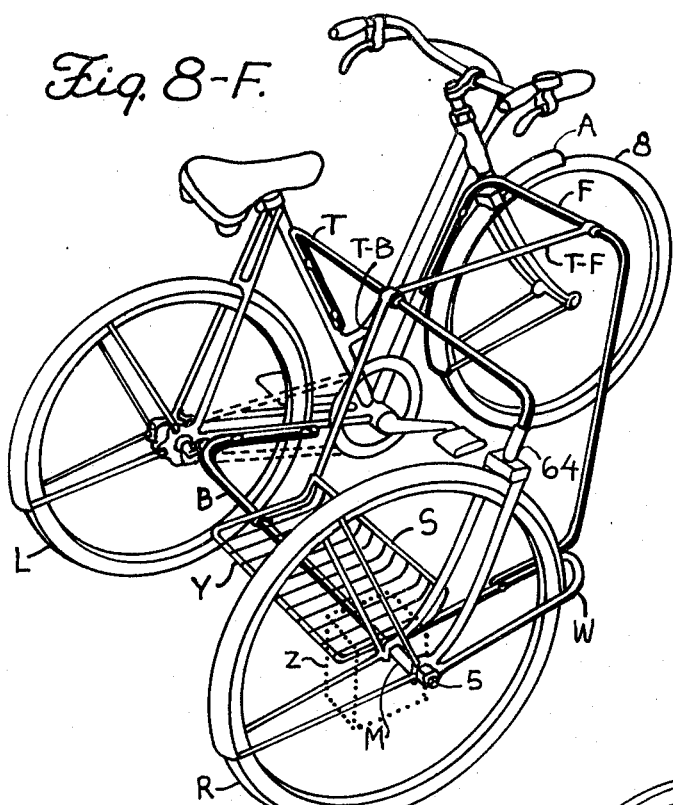
Fig. 8-F.
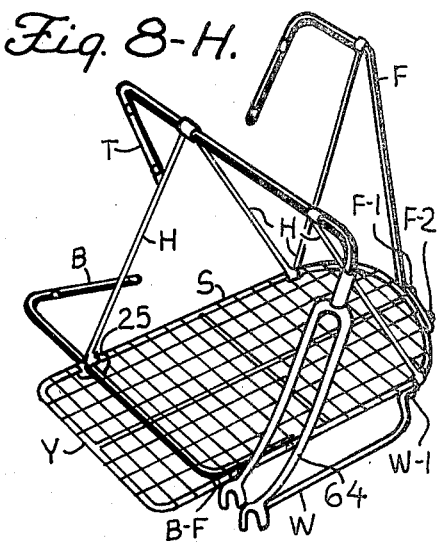
Fig. 8-H.
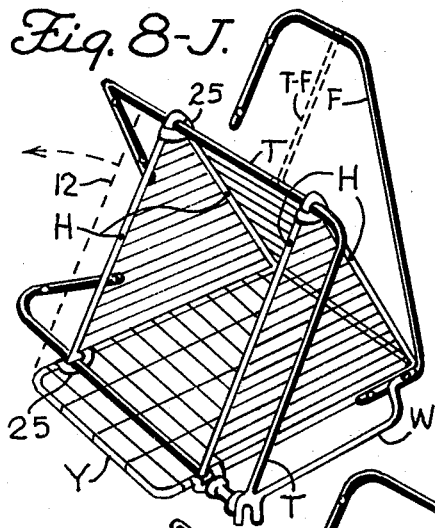
Fig. 8-J.
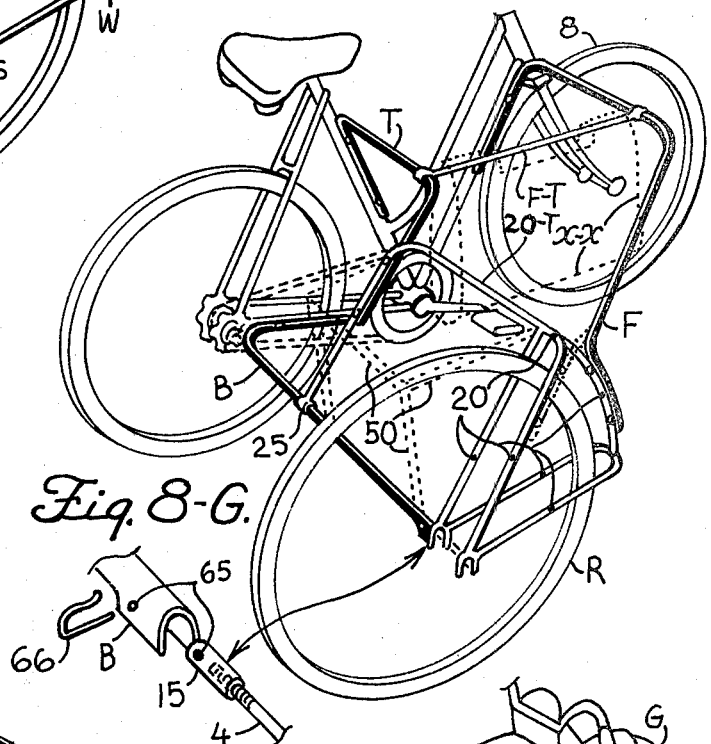
Fig. 8-G.
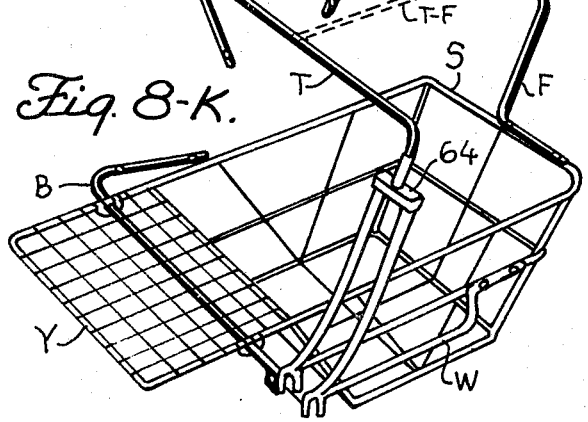
Fig. 8-K.
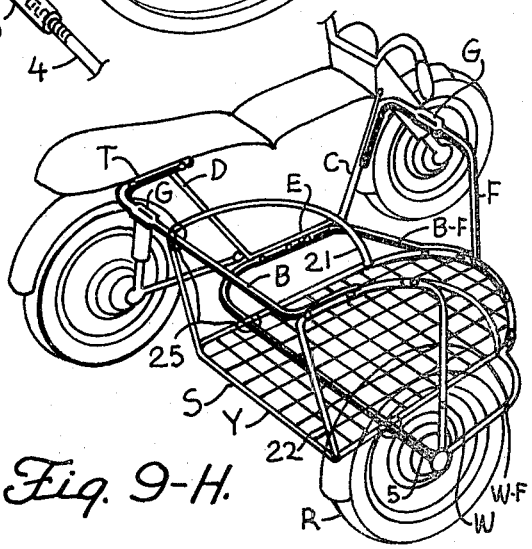
Fig. 9-H.

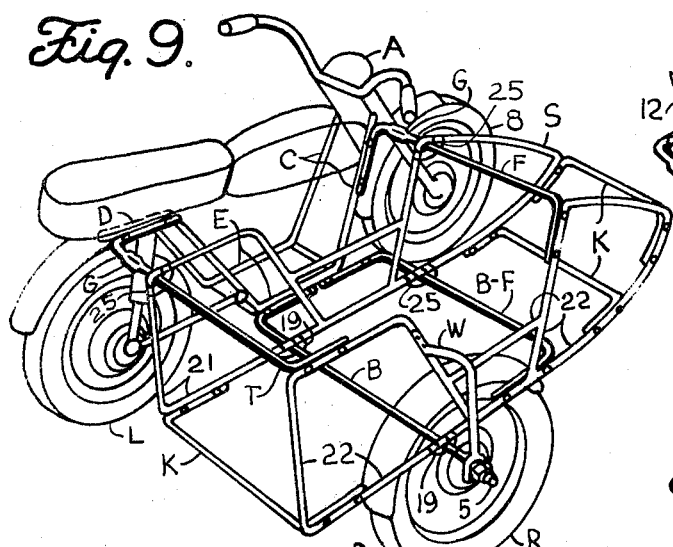
Fig. 9.
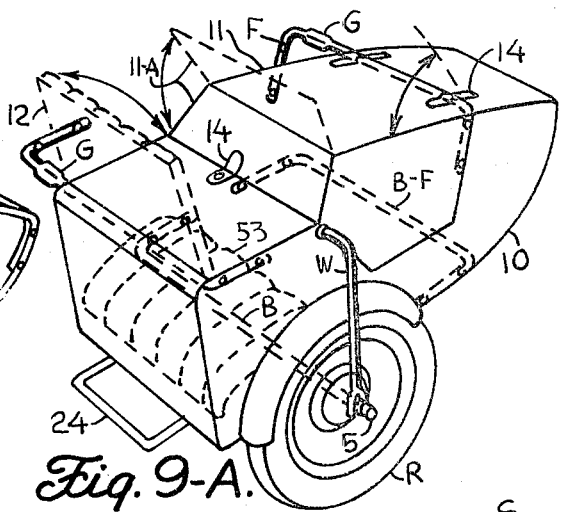
Fig. 9-A.
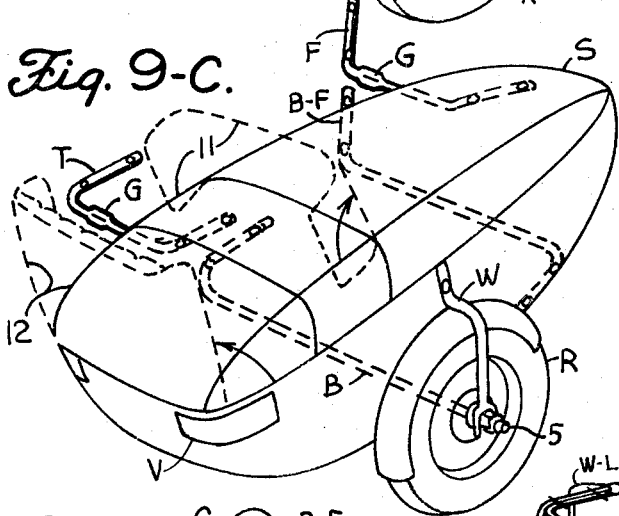
Fig. 9-C.
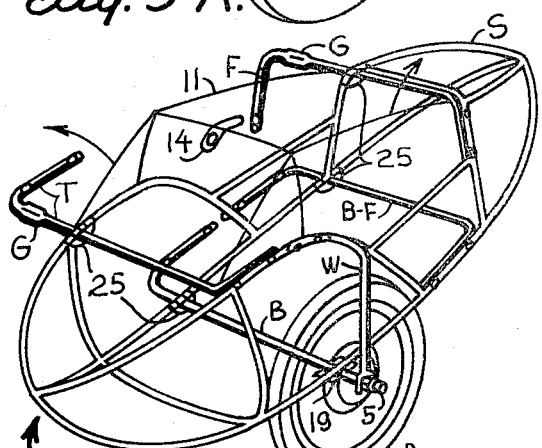
Fig. 9-B.
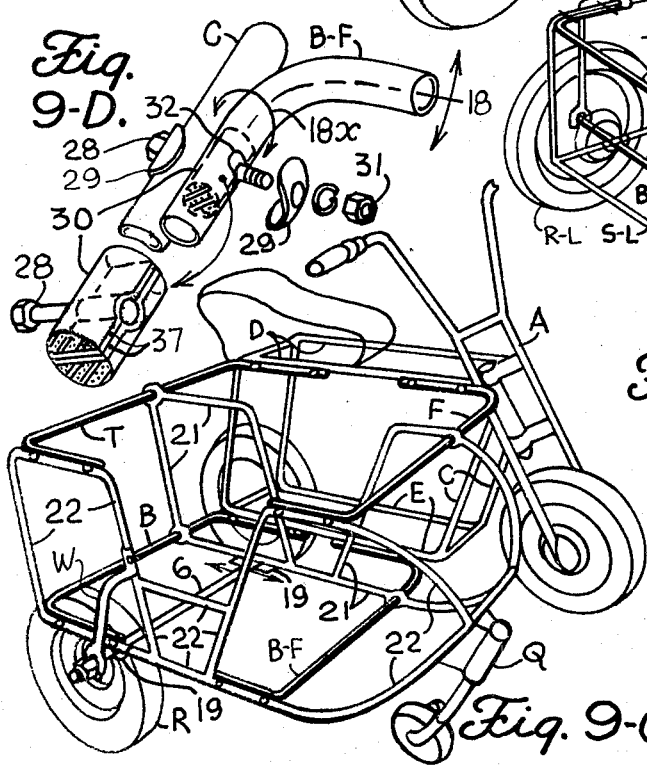
Fig. 9-D.
Fig. 9-G.
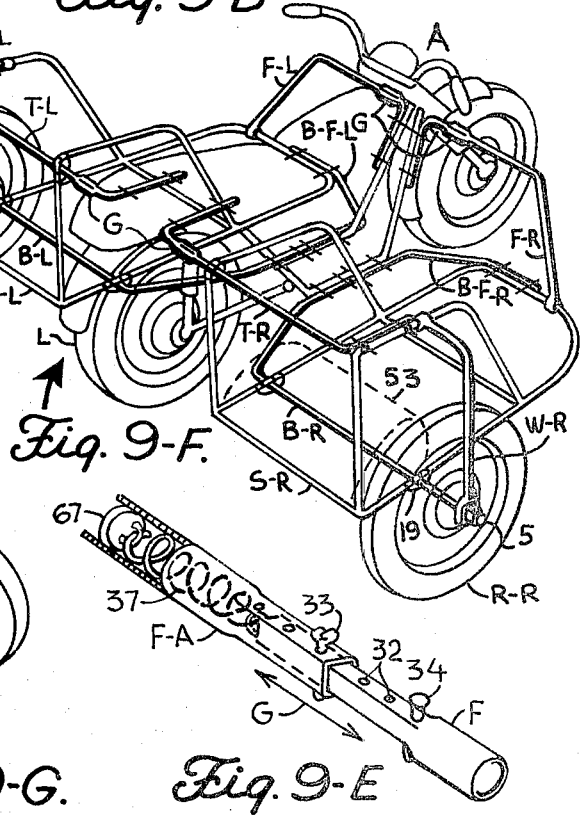
Fig. 9-F.
Fig. 9-E.

TORSIONALLY RESILIENT STRUCTURE FOR A SIDECAR

SUMMARY OF THE INVENTION

This application is a continuation-in-part of my copending application Ser. No. 437,482 filed Jan. 28, 1974 and now abandoned, entitled "Apparatus for Constructing Torsionally Resilient Vehicles."

The primary object of this invention is to provide simple means to construct a torsionally resilient sidecar and to resiliently secure it to any two-wheel, tandem type vehicle thus enabling its owner to transport additional people and cargo in it when desired and easily detach it to operate the original two wheel vehicle individually as before.

There have been many attempts to provide a sidecar and its connecting means to bicycles and motorcycles, but none of them utilized the presently disclosed and utilized torsionally resilient means of construction and attachment. The present invention discloses integrated frame and coupling system which is conceived on the principle of the torsion-type suspension and torsionally resilient coupling means between any two-wheeled, tandem type land vehicle and easily attachable and detachable sidecar structure, the resulting vehicle being able to carry much greater useful loads of people or cargo in endless combinations of them as desired by its owner.

When coupled to any type of a pedal propelled vehicle such as a bicycle, it provides for local transportation of children, groceries and other cargoes, thus replacing the second car for local errands; retired people, invalids and those unable to use the regular bicycle could be easily transported by it or operate it themselves since no balancing is required.

When coupled to any type of a motor driven two wheel vehicle such as motor assisted bicycles, mini-bikes, scooters, motorcycles and such, it increases their usefulness and pleasure of ownership by utilizing the power of their engines to transport heavier loads. Thus any owner of any type of a two wheel motorized vehicle would have the choice of riding it for his own individual transportation, for sport, cross country or trail riding as before, or, by easily coupling the sidecar to it, could transport other people or various cargoes over the regular streets and roadways used by any normal four wheeled vehicles.

This type of a sidecar and its coupling is made possible by the use of uniquely conceived connecting members, each of them bent to form a longer mid-portion and two shorter end-portions; their longer mid-portions serving as transverse spacers between the two wheeled vehicle and its sidecar, while their bending flexure and torsional twisting resilience about their longitudinal axis providing torsional suspension for all three wheels in relation to each other by means of their shorter ends which are connected to the suitable members of the two-wheeled vehicle frame on one side and to the frame structure of the sidecar on the opposite side, thus making the shorter ends act alternately as either the lever-arms of the torsionally resilient connecting members or as means of their attachment to the rigid frame of the combined structure.

Thus the connecting members perform several basic functions:

1. they maintain the sidecar and the main vehicle in stable and parallel relationship to each other under all normal driving conditions and loads, over all types of normal roads;

2. their torsionally resilient mid-portions provide sufficient degree of bending flexure and torsional twisting resiliency about their longitudinal axis to enable all wheels of the resultant vehicle to follow their own terrain and road irregularities independent of each other;

3. their torsional suspension characteristics are individually adjustable to negotiate varied load and road conditions;

4. they are adaptable for use as the main transverse members of the sidecar frame, making it more resilient and road worthy;

5. they provide for better distribution of total weight to be carried by all three wheels;

6. they provide more resilient interconnection between the two assemblies, thus increasing the roadability of the combined vehicle and increasing its ability to carry relatively greater loads.

Several other functional advantages provided by this invention any many other benefits of it will become more apparent upon consideration of the following specification and accompanying drawings wherein like characters of reference designate substantially corresponding parts through the several embodiments of this disclosure in which:

FIG. 1 is a perspective view of a sidecar attached to a typical bicycle according to this invention;

FIG. 2 is a diagrammatic plan view of such an assembly;

FIG. 3 is a diagrammatic side view of such an assembly;

FIG. 4 is a diagrammatic front view of the same assembly;

FIG. 5 is a detail perspective view of the "toe-in" adjustment;

FIG. 6 is a perspective view of a tubular frame structure for a general utility sidecar;

FIG. 6-A and FIG. 6-B are detail views of suspension means;

FIGS. 7, 7-A and 7-B are detail views of various configurations the connecting member may assume when serving as an axle support;

FIG. 8 through 8-E show six embodiments of the sidecar;

FIGS. 8-F through 8-K show five more embodiments of the sidecar;

FIGS. 9 through 9-C illustrate four embodiments of the sidecar as used with a motorcycle;

FIG. 9-D is a view of mounting means for the connectors;

FIG. 9-E illustrates an adjustable connector means;

FIG. 9-F illustrates two sidecars attached to a motorcycle;

FIG. 9-G illustrates a sidecar attached to a scooter;

FIG. 9-H illustrates a minimal sidecar attached to a motorcycle;

FIGS. 10, 10-A and 10-B illustrate a multipurpose embodiment of a sidecar construction;

FIG. 11 illustrates another type of attachment means;

FIG. 12 illustrates connector adapted to serve as an axle.

Referring to the drawings wherein like numerals designate similar parts throughout this description, and the two-wheeled vehicle, regardless of its configuration, will be called "main vehicle", FIG. 1 is a general perspective view of a typical ladies type bicycle as it would appear when coupled by the presently disclosed torsionally resilient connecting system to a typical sidecar structure, with the sidecar wheel R spaced at least 32" or 80 cm from the rear wheel L of the bicycle.

In applicant's Patent application Ser. No. 597,311, filed Aug. 8, 1975 the torsional type of suspension coupling is applied to operatively couple any two tandem-type two-wheel vehicles, resulting in a unique four-wheel vehicle. This disclosure provides for coupling of a one-wheel sidecar to any two-wheel tandem-type vehicle, producing a three-wheel vehicle of great stability and usefulness but presenting somewhat different problems in its suspension, control and roadability characteristics. Therefore, only those factors, embodiments, combinations and modifications which differ from those already disclosed in Patent application Ser. No. 597,311, filed Aug. 8, 1975 are presented and disclosed while those means which may be considered common or interchangeable to both types of vehicles are omitted from this disclosure but considered as applicable to it in all respects as may be deemed expedient or necessary to their successful implementation.

As shown in FIG. 1, three torsion tubes F, T and B are interconnecting the sidecar S to the bicycle A; each of them is bent to form a longer mid-portion and two shorter end-portions; their longer mid-portions being positioned substantially horizontally and transversely between the bicycle frame and the sidecar structure, their shorter end-portions at one side longitudinally aligned with the correspondingly positioned frame members of the bicycle and at the other side connected to the sidecar structure.

Thus, one shorter end-portion of the front torsiontube F is attached at points F-1 and F-2 to the down tube 1 of the bicycle A, its opposite shorter end-portion is secured to the rigid member on the outboard side of the sidecar S at two points FS-1 and FS-2. One shorter end-portion of the top torsiontube T is attached at two points T-1 and T-2 to the seat tube 2, its opposite short-end is modified to fit over the rigid stub axle shaft 4 at each side as TS-1 and TS-2. One shorter end-portion of the back torsiontube B is attached at two points B-1 and B-2 to the chain-stay tube 3, its opposite short-end secured to the rigid portion of the sidecar S at BS-1 and BS-2.

To support the inboard side of the sidecar S, eye-bolt type hangers H are operatively suspended from torsiontubes F and T, being modified to allow free rotation of the torsiontubes within them and secured to the inboard side of the sidecar structure S at such points as H-1 and H-2. If the sidecar body is not sufficiently rigid, the torsiontubes may be secured to it by means of U-bolts and reinforcing plates as shown at BS-2, thus distributing the torsional load over sufficient area. The sidecar could be produced in many configurations, but as shown in FIGS. 1, 2, 3 and 4, in this instance it is formed of synthetic materials such as fiberglas and the like, comprising the bottom shell 10, offering just a simple open enclosure as in FIG. 8-A or 8-B; over it is easily fitted front hood 11, to provide partial wind screen and secured to it by fastening means 35. To make the sidecar completely element-proof, dual purpose panels 12 and 13 may be added as needed and if they would be provided with a lock 14, the sidecar could be made pilferproof. Thus, when used as a cargo carrier, either or both of panels 13 and 12 could be unlocked to make the interior accessible, but when transporting people, the panel 12 would slide back far enough to provide an adjustable seat and panel 13 would be tilted upwardly to provide a wind screen as best seen in FIG. 3.

The basic operational behavior characteristics of any sidecar are determined by many factors, such as the type of the vehicle it is coupled with, its center of gravity and over-all weight distribution, the type of load carried, the road conditions, wind resistance, speed traveled and many other circumstances, and while the adaptation for regular bicycle, traveling at low speed and carrying light loads over relatively smooth streets is comparatively very simple, when building sidecars for motorcycles and such, at least three factors have to be considered: the "off-set" and the "toe-in" of the sidecar wheel and the "lean-out" of the main vehicle. They are provided for in the following manner:

While the "off-set" is really not essential when the main vehicle is any common bicycle, it may be incorporated if deemed expedient as shown in FIG. 1, wherein the outboard shorter portion of torsiontube B may be bent in either forwardly or rearwardly direction to align with sufficiently rigid portion of the sidecar and secured to it as at BS-1 and BS-2, while the separate short axle 4 is located where desired and secured in the manner as shown in FIG. 5, in which the bottom body shell 10 has on its outboard side axle housing 9. The sidecar axle 4, which may be a regular front wheel axle of the same type as on the main vehicle A, has an axle extension means 15 threaded over the inboard end of the axle 4. The extension 15 is operatively slidable within the elongated opening 16 in the wall of the housing 9, which also has threaded holes in its forward and rearward facing sides to accept the "toe-in" adjustment type bolts 17. Thus, when properly assembled, as shown in FIG. 1, the sidecar wheel R will be securely supported by wheel stays T and T-1 of the torsiontube T and longitudinally stabilized by the wheel stay W secured to the body shell 10 at W-1 and FS-2, thus positioning the wheel R parallel to the longitudinal center line of main vehicle A.

To provide for proper "toe-in" when needed, as indicated by N in FIG. 2, and which may be as much as 50 mm narrower at point N than at point N—N, the bolts 17 are screwed in or out as needed to position the axle extension 15 anywhere between the arrows 18. Thus, since the outboard end of axle 4 is permanently fixed by the wheel stay W, the forward "toe-in" adjustment bolt 17 is screwed in until the center line of axle 4 forms the desired angle to provide the desired amount of "toe-in" and then the rearward bolt 17 is screwed in to lock the axle extension 15 in the desired position.

When a longer separate axle such as 6 is used as shown in FIGS. 6 and 9-G, its outboard end is located and secured in the proper "off-set" position to the outboard frame member 22 of the sidecar frame 20, and its inboard end is adjustably secured by means 19 to the inboard frame member 21 in such manner whereby the axle 6 will form the required angle with the center line of the main vehicle A to provide the needed "toe-in" of the sidecar wheel R. Thus, either type of the axle is always easily adjustable as may be required for varied use of the three wheel vehicle.

To provide for proper "lean-out" of the main vehicle when it is desirable, the top torsiontubes F and T have their longer mid-portions sufficiently longer than the back bottom torsiontube B, whereby as indicated by arrow P in FIG. 4 the main vehicle A is made to lean away from its vertical center line by 5 to 20 mm when both the sidecar and the main vehicle are occupied. This type of "lean-out" may be increased sufficiently whereby it will provide the desired degree of "camber" for high crown paths and roads. Of course, when the torsiontubes F and T comprise the slidably floating adjustment means as explained in FIG. 9-E, the "lean-out" and the "camber" adjustments are readily made as desired by simply locking the torsiontube sections FA and F in any desired relation by the locking pin means 33.

FIG. 6 illustrates a typical frame structure for general utility type of a sidecar, constructed of light metal tubing welded into two longitudinal sides 21 and 22 and joined by bottom transverse members 23 which could be of the torsiontube type of configuration, thus forming a three-sided frame structure adaptable for endless types of sidecar configurations to carry varied cargo, people or both in all kinds of combinations. While the outboard frame 22 is supported by the wheel R, located at the desired "off-set" from the back wheel L of the main vehicle, the inboard frame 21 is resting over the torsiontubes F, T and B and kept in operative but silent contact with them by locating means 25 shown in more detail in FIGS. 6-A and 6-B; they are configured of hard but resilient material and provided with openings 26 to fit over the torsiontubes, allowing them free torsional activity without any noisy metal-to-metal contacts when the sidecar is negotiating rough terrain; they may be provided with set-screw means 17 whenever they are used over straight tubes and their locations are to be definitely secured instead of allowed to float over them. The vertical wheel stay W is securable to any convenient member of the frame 22 and another horizontal wheel stay could be secured to the bottom tube of frame 22 as indicated in FIGS. 1 and 8-H. Also, this basic type of a sidecar frame could be easily converted into a push cart by installing another wheel on the inboard end of the axle 6 as further suggested by FIG. 10. This type of frame could be equipped with permanent or removable floor, side panels and top covers to meet the need of various transportation requirements and the front outboard swivel wheel Q would prevent the front right corner from scraping the ground.

FIGS. 8, 8-A, 8-B, 8-C and 8-D illustrate several ways of utilizing this invention even in the most prosaic manner. Looking at FIG. 8, the sidecar S may be just a "garden cart" commonly available, made of steel or other suitable material, in this case measuring roughly 20"×26" bottom panel, 20"×39" top rim and 11" deep (500 mm×660 mm bottom panel, 500 mm×1 meter top rim and 280 mm deep). The bottom torsiontube B is modified to accommodate the axle 5 which accepts front wheel hub M of the same type as the front wheel 8 of the main vehicle, making them interchangeable in use, and the wheel stay W stabilizes the wheel R in proper longitudinal position. For local usage at low speeds and normal loads no "off-set" is necessary, and if the axles of both rear wheels are in line there is no need for "toe-in" either, while the "lean-out" and the "camber" may be provided by simply making the longer mid-portion of the lower torsiontube B slightly shorter as needed. To this bare cart may be added simple panels as 50 which is slidably secured to the top flange of the sidecar S or which may be foldable by means of hinges 36, thus either making a cover or platform up to the support H-T or, when pulled back and dropped down, allowing a person to sit on it, using the torsiontube T as an assist bar; thus the whole side cart could be either covered to protect its contents from elements or made into two seats by folding them and slidably adjusting them as needed.

FIG. 8-A shows how an ordinary folding chair 51 could be used to transport older people; it could be secured to the torsiontube T by fasteners 35 and when not needed it could be folded and carried in the bottom of the sidecar S. The safety belt X may be used to secure an invalid person in the seat and the step 24 could serve as the foot rest; of course the seat could face forward and the torsiontube T could serve as an assist bar.

FIG. 8-B shows a molded seal sheel 52 positioned and secured on top of the panel 50 with the safety belt X secured to the sidecar body S while the torsiontube T is provided with cushioning sleeve 55 to function as a general assist bar for the seat occupant. It should be noted that the front torsiontube F may be secured to the front of the sidecar either at its outboard side as in FIG. 8, at its middle as in FIG. 8-A or at the inboard front corner as in FIG. 8-B, depending on the stability required. The auxiliary swivel wheel Q could be used in low profile sidecars as in FIG. 8-A.

FIG. 8-C illustrates how various enclosures could be used in conjunction with even this type of simple configuration. The hood 11 could be fitted over its front for partial protection and the cab-type cover 40 could be rotated around hinges 36 to allow easy entry and exit for its passenger; the lock 14 could keep the unit pilferproof when used for transportation of cargoes.

FIG. 8-D show another embodiment for commercial use with larger enclosures. All of these types of covers could be of soft, semirigid or rigid materials of any suitable substance and be either easily removable and exchangeable or installed permanently.

FIG. 8-E illustrates a personal type of a sidecar structure S which would be preferably of molded synthetic material with most of the torsiontubes out of sight and the back hood 12, with lock means 14, functioning either as the trunk lid to allow access for loading and unloading of the sidecar or swinging backward and locking in several positions to act as a seat-back with its cushion 54 when the seat cushion 53 is occupied by a passenger.

FIGS. 8-F, 8-G, 8-H, 8-J and 8-K show just a few of many possible configurations of this invention as it could be applied to the light duty, open type, all metal and very minimal or "stripped" models. It is usable by the young for fun and local errands, by those who desire its extra capabilities to transport occassional cargo or a friend and by those who have trouble balancing an ordinary bicycle who could use it as a convertible "three wheeler" at much less cost and much more usefulness to them.

FIG. 8-F illustrates the very minimum embodiment of the present concept, with the torsiontube B adapted to serve as the axle support for the wheel R which is further supported by torsiontube T modified to be secured to an ordinary front wheel fork 64 but facing backward. The wheel stay W is supported by the outboard shorter portion of the front torsiontube F which has an extra bend in its midportion to allow it to drop downwardly and rearwardly in order to reach the stay W. Spacer means T-B and T-F help to keep all three torsiontubes in proper transversely parallel alignment, thus resulting in a very economical but very roadworthy three wheeler operable even without any more additional accessories but to which various travel and transportation aids could be secured as disclosed in more detail in Patent application Ser. No. 597,311 filed Aug. 8, 1975. The wire stand Y may be added and the longitudinal spacer T-F provides a hand rest or assist bar for the operator of the tricycle; to provide for any type of electrically operated accessories such as lights, turn indicators, horns etc., a storage battery may be carried in container Z preferably located close to the wheel R, and if not a battery, then some heavy weight could be carried in it to help in balancing the vehicle when operated by an amateur.

FIG. 8-G illustrates another modification, in which the wheel fork 64 is replaced with the minimum sidecar frame 20, configured preferably of welded tubular steel and operatively connected to the mid-portion of torsiontube B at 25 on its inboard side and on its outboard side comprising two wheel stays cooperatively interconnected and adapted for securement to the front torsiontube F. The outboard end of the torsiontube B is modified by being locally flared open on its bottom to accommodate the axle extension 15 screwed over the inboard end of axle 4, thus allowing the whole wheel R to be dropped out just like the front wheel 8 of the bicycle by simply removing the cotterpin 66 from the correspondingly located holes 65 in the flared portion of torsiontube B and the axle extension 15. Various items could be carried suspended over the spacer means F-T as suggested by brief case X-X and a seat as 50 could be supported as indicated by dotted lines to torsiontube B and the horizontal portion 20-T of the sidecar frame 20.

FIG. 8-H illustrates an embodiment of the sidecar structure S in form of a foot stand Y, its tubular frame operatively secured to the torsiontube B as at 25 on the inboard and by means B-F at the inboard side of the wheel fork 64, while its front is secured to torsiontube F at F-1 and F-2. The auxiliary eye-bolt type spacer means H are operatively but rigidly bracing all three torsiontubes to the frame of the stand Y. The wheel stay W may be secured to the frame Y in adjustable manner at W-1 to provide for "toe-in" of the wheel if desirable.

FIG. 8-J illustrates a further embodiment of the minimal sidecar configuration wherein the basic structure comprises tubularly framed floor panel Y combined with front and side screens defined by hanger means H operatively secured to torsiontube T by resilient means 25, thus providing means to stand or sit on and to carry varied cargoes and auxiliary attachments. To fully enclose this triangular enclosure a hinged, positionally adjustable panel 12 could be added, while the auxiliary brace T-F would add rigidity.

FIG. 8-K presents an open type of a sidecar S wherein its lower portion would serve as a carrying enclosure for sundry goods while the back panel Y could serve as a seat or stand with the torsiontube T serving as an assist bar for the sidecar passengers and the auxiliary brace T-F is slidably adjustable over torsiontubes T and F as required.

All of these open-type configurations would offer minimum wind resistance and would be constructed to complement and match the structural characteristics of the main vehicle as to the roadability, weather resistance and parts exchangeability of it and would be finished to match the main vehicle to create unified and harmonious combination.

FIG. 9-H illustrates the minimal type of an open style sidecar structure as applied to any type of a motorcycle; it offers the least of wind resistance and is adaptable to carry not only cargo but people in many combinations.

It comprises the tubularily framed floor panel Y with two sides 21 and 22 securely welded to it and the whole resting on top of torsiontube B and secured to it by means as 25. The outboard upper corner of side 22 is secured to the outboard shorter portion of torsiontube T while the back upper corner of side 21 rests over and is secured to the longer mid-portion of of torsiontube T by means as 25. The upper front torsiontube F has an added bend to it to operatively secure the front frame of panel Y and the torsiontube B-F is operatively secured to the front inner side of the floor frame Y. The upright wheel stay W provides outboard support for axle 5 and the horizontal stay W-F is secured to the frame Y in adjustable manner to allow for the "toe-in" adjustment of the wheel R. Both torsiontubes F and T may be provided with the slidably operable adjustment means G as explained in FIG. 9-E and if the torsiontubes B and B-F were secured to the main vehicle by means as explained in FIG. 9-D, very resilient and roadworthy vehicle would result. By leaving the adjustment means G out from the front torsiontube F the structure would become more rigid but giving better support to the front portion of the floor panel Y and increasing its load carrying capability.

FIGS. 9, 9-A, 9-B, and 9-C explain just four of many possible adaptations of this invention for coupling any type of a sidecar to any type of a motorcycle or the like. As seen in FIG. 9, the motor cycle A represents any type, model and size of an existing two wheel motor propelled vehicle, with its basic frame structure suggesting the continuous double-cradle type, but it could be adapted just as easily to a single cradle or any other type of frame structure of sufficient rigidity and in this preferred embodiment it comprises four torsiontubes interconnecting it with the sidecar S.

The upper front torsiontube F is secured to the downtube C at two points. The upper back torsiontube T is secured at two points to the frame structure D under the seat, and torsiontubes B and B-F are each secured to the lower frame E at two points. These locations are approximate, since various motorcycle frames present various mounting conditions, thus the shorter end portions may be bent at whatever angle will be necessary to provide for secure attachment of them and as suggested in FIG. 9-C.

Looking at FIG. 9, the sidecar S is preferably constructed of two identically configured frames 21 and 22 which could be produced of welded tubing, metal stamping or any other suitable material from wood to synthetic compositions, and they are held in spaced-apart relationship to each other not only by the auxiliary torsiontubes K, which determine the transverse dimensions of the sidecar and are located as necessary to provide resilient stability to it under all load and road conditions, but in this case also by all of the torsiontubes. The torsiontube B is adapted on its outboard end to accept the axle 5 as explained in FIG. 12 and the length of its inboard short-end portion is determined not only by the location of the convenient means of attachment at the main vehicle A but also by the desired amount of the "off-set" for the sidecar, and it could assume the shape of the B-R and B-L in FIG. 9-F or of B in FIG. 9-G, unless the wheel R would be supported by the separate long axle as 6 in FIG. 9-G, thus allowing the freedom of varying the "off-set" of the wheel R as desired; the wheel stay W is secured to the frame 22 in the most efficient way and in such manner whereby it may be readily removed when changing the wheel R.

FIG. 9-A is a perspective view of one of many possible shapes that a sidecar frame constructed according to FIG. 9 could assume, in this case showing the very minimum of fancy styling and just sufficient to cover its frame structure to make it practical for both human and cargo transportation. The body panels as 10, preferably fabricated of synthetic materials would be fitted and secured to the tubular frame members. The main hood 11 swings upwardly on hinges 14 to allow access to the sidecar interior and its panel 11-A may be opened upwardly to act as a windscreen when the sidecar is used by a person seated on seat cushion 53, using the hinged panel 12 as the seat-back cushion, while lock means 14 would be used to secure the unit at all other times. Both covers 11 and 12 are easily removable to provide an open-type of a sidecar.

FIG. 9-B illustrates how even the classic configuration of the sidecar may be achieved with panels 11 an 12 opening in the direction of the arrows to permit access to its interior and the lock means 14 securing the unit agaist pilferage and again both 11 and 12 panels would be easily removable to create an open sidecar.

FIG. 9-C illustrates how the torsiontubes F and T could be secured to the inboard side of the sidecar and how even the torsion tube B-F could be secured to the down tube C instead of bottom tube E if more desirable. The auxiliary light V signifies any and all types of reflectorized or electrically operated systems of light accessories, such as turn indicators, stop lights, etc. that could be incorporated into the sidecar combination.

FIG. 9-F illustrates an adaptation of left and right sidecars to one main vehicle A, thus producing a four-wheel vehicle of many posibilities and allowing one or both sidecars to be used as needed. The sidecars could be of any configuration desired except that the overall width of the double assembly should conform to the prevailing highway regulations and city usage. The sliding adjustor means G allow all three rear wheels to travel independently of each other and assure positive traction for the main rear wheel L; this type of a combination could be useful for sight-seing taxi service and similar endeavors since the forward section of the sidecar floor could serve as a large platform for luggage while the seat 53 could accommodate passengers.

FIG. 9-G illustrates a torsiontube suspension type of sidecar attached to a "scooter", a minibike or any other type of small motor driven vehicle A; of course, if it would be of the pedal and motor powered combination, the bottom front torsiontube B-F would have to be left out to allow for the operation of foot pedals. For light duty models the torsiontubes could be replaced with torsionrods of proper size and secured to the main vehicle A frame tubes C, D and E in the most suitable manner as explained elsewhere and the inboard side of the sidecar frame 21 may be suspended over them either by the use of locators 25 or by locally collapsing the tubes of 21 and providing holes for inserting the torsionrods through them. The most economical way would be to simply rest the tubes of 21 over the torsiontubes and secure them operatively together with ordinary U bolts. The frame structure could be shaped and covered in the same fashion as any of the sidecars previously described, only on the diminutive scale. The "off-set" is provided by using separate axle 6 secured on its outboard side by axle mounts 19 and on its inboard side adjustably by another mounts 19 to provide the proper "toe-in" if desired. If the sidecar would have tendency to scrape its front bottom when traveling overloaded, a swivel wheel Q could be secured to the outboard front corner to eliminate such problem.

FIGS. 10, 10-A and 10-B illustrate a heavy duty, general utility convertible sidecar useful for broad range of transportation applications. It may be constructed by making the lower portion of it from sheet-metal, its floor approximately one meter square with its three sides 46 approximately thirty cm high, with their top edges reinforced by flanges and their back edges adapted to slidably accept a rigid gate 44, including chain means 47 to prevent the back ends of sides 46 from spreading, thus forming an enclosure to haul any heavy cargo. When more bulky items are to be transported, the low tailgate 44 is lifted out and the high side assembly 42 is positioned into the sidecar as suggested by the dashed lines in FIG. 10 and in more detail in FIG. 10-B, wherein the three sides, preferably of alluminium sheets and one meter high are joined by hinge means as 43 to form the three sided enclosure, with its upper edges properly reinforced to make them rigid while allowing it to be folded when not used. The high tail gate 45 is inserted instead of the low tailgate 44, its overlap panels 58 fitting on the outside of the metal side panels 42, thus stabilizing the back corners with the tailgate locking means 57 holding the panel 58 and 42 securely and rigidly together. The reinforcing means 49 on panels 42 comprise means of attaching to them the top cover 60 which may be just a tarpaulin or of the semi-rigid or rigid type. Varied types of holding accessories as 48 may be installed as needed, including a three section handle bars 56 easily removable or foldable against the sidecar, foldable stand 59 and hitching means 61 and 62.

The sidecar S is provided with transverse axle 6 securable to the bottom of sidecar S in two ways: either at the right angle to its planview center line or at a proper angle to it to provide the required "toe-in" for wheel R; both axle ends are modified as in FIG. 12 to accept wheels R and R-L as needed and the wheel stays W are secured to the reinforced flange section by bolts for easy removal of the wheel R or R-L. The torsiontubes T,B and B-F are secured to the inboard side of the sidecar rigid lower section and front torsiontube F may be secured in the same fashion or at any desired location to the front panel as shown in FIG. 10; of course, if the bottom of the sidecar is above the height of the frame and rear axle of the main vehicle, the bottom torsiontubes B and B-F could be extended under the sidecar floor panel as far outboard as desired.

This type of a convertible, multi-use sidecar could serve in any of the following capacities:

1. as a heavy duty, general utility sidecar as indicated by solid lines in FIG. 10;

2. as a heavy duty, large bulk carrier, by utilizing the high panels 42 and high tailgate 45;

3. as a two-wheel general utility cart, by installing the left side wheel R-L and the handle bar means 56 to it, with folding stand 59 used for stability;

4. as a two-wheel trailer to be attached to any land vehicle by trailer hitch means 61 or 62.

The above described configurations are only illustrative of the varied and useful combinations and embodiments of this invention that could be suggested and produced by any person skilled in the art, but the following details are included for further clarification of this description and attached claims.

FIGS. 7, 7-A and 7-B help to explain in more detail other configurations the torsiontubes may assume to efficiently couple any sidecar to any type of a two-wheel tandem type land vehicle. FIG. 7 illustrates the bottom torsiontube B which is secured to the bottom frame tube E of the main vehicle A such as shown in FIG. 9, by the use of modified collar-and-bolt means 38 with cushioning bushing means 39 as shown in more detail in FIG. 11, allowing the torsiontube B to rotate freely and silently within it; also, the end of the torsiontube is modified to accept lock nut means 31, thus allowing the two collar means 38 to remain on the main vehicle at all times; when necessary, the torsiontube B would be slidably inserted through them and the lock nut 31 would secure the two assemblies together. Alternatively, the bolts may be removed, in which case sleeves would be mounted in the bolts drilled in the bicycle tubes to prevent entry of foreign matter. The outboard shorter end portion of the torsiontube B is bent toward the axle of the sidecar wheel and welded to it is the wheel stay W, thus forming a rigid fork for supporting the modified axle 5 and providing it with resilient type of torque suspension since the adjustably positionable mount plates 19 allow the torsiontube to rotate within them. Any auxiliary spring suspension means as 37 may be used as desired. The axle mount plates 19 may be secured adjustably to provide not only the "off-set" but also the "toe-in" adjustment if desired.

FIG. 7-A presents the shorter outboard portion of torsiontube secured to modified stub axle 5 which is assisted by auxiliary spring means 37, for use with small diameter wheels for light duty. FIG. 7-B shows an off-set type of an axle-torsiontube combination formed into double bent, with the axle stock 5 inserted into the torsiontube B as also explained in FIG. 12, either up to the arrow 1 for lighter type of a sidecar or all the way to point 2 for heavy duty work, thus the torsiontube retaining its softer resiliency in its longer mid-portion but being very rigid at its shorter end portion for added torque resiliency under heavy use. These type of inserts may be used even in the inboard shorter end portions of them. These three Figures are presented to show how varied the configurations of any of the torsiontubes may be while still adhearing to the scope of this invention.

To make the combined vehicle even more pliable and responsive to varied road conditions and modes of its usage, the top torsiontubes F and T may be modified to allow the wheel R of the sidecar to follow its own terrain irregularities even further without adversly affecting the verticality of the main vehicle. Looking at FIG. 4 it is obvious that if all torsiontubes would be of unchangeable transverse dimensions, the verticality of the main vehicle would be affected when the sidecar wheel R would be undully raised or lowered; this condition is eased by splitting the upper torsiontubes F and T at the location indicated by G in FIG. 4 and other figures and making their split portions controllably, slidably cooperative with each other as explained in more detail in FIG. 9-E, which shows the cut ends F and F-A modified by forming them into square sections for slidably operative engagement with each other. Thus, when the sidecar wheel R would be excessively dropped or raised by the road surface, the modified ends would just slide in or out within each other. Also, these modified portions may comprise plurality of openings 32 adapted to accept pins 33 to lock the portions in any desired transverse length, thus controlling the "toe-in" and camber of the two rear wheels, and to limit the extent of this slidability, pins 34 may be inserted only through the inboard portion of the torsiontube; for extra heavy duty these modified ends may be reinforced before forming and to provide initial resistance and cushion to their slidable movement, the plug 67 is secured within the portion F-A and the spring means 37 is operatively secured to it and to the inner end of the tube F thus acting as compression and extension spring for both portions of the torsiontube.

As shown in more detail in FIG. 9-D, all torsontubes may be secured to their respective locations in more yieldable manner by drilling proper size holes 32 to accept bolt means 28 through both sides of each tube, however, the hole 32 facing in the inboard direction of the torsiontube is elongated at the right angle to the longitudinal axis of the tube as desired; the resilient plug 30, also with a round hole in it to accept the bolt 28 is located within the tube, so that when the tube B-F moves back and forth as indicated by arrow 18, due to the uneven travel of the two rear wheels of the vehicle, this motion is converted into rotating movement of its shorter end portion around its longitudinal center line as is indicated by arrow 18X; since the resilient plug 30 has only a round hole in it, the tube B-F will rotate around its round hole next to the tube C but compress the plug 30 left or right depending on the movement of tube B-F, thus providing the initial degree of resiliency before the torsional quality of the tube's mid-portions is engaged. For heavy duty work, the plug 30 may be modified as shown in the enlarged view of it, wherein the plug 30 is in two identical halfs and the two identical and rigid spacer plates 37, shaped to fit around the bolt 28 increase the resiliency of the system by dissipating the intermittant torque load into the whole length of either half of the plug 30 and also acting as a bushing for the bolt 28. This system of connecting the torsion tubes between the main vehicle and its sidecar could be used throughout where beneficial.

FIG. 12 illustrates how the outboard end of the torsiontube B is modified to serve as an axle 5 for the sidecar wheel R by simply inserting the proper size axle 5 into its end and collapsing it around it; the bolt or pin as 27 would secure it within and the bushings as 63 would be provided as needed.

Any of the described embodiments of the torsionally resilient interconnecting structure to operatively couple a sidecar to any existing two-wheel tandem type vehicle may be installed to either side and include various controls, accessories and conveniences as desired for more efficient transportation of goods and more comfortable and safe transporting of people as disclosed in patent application Ser. No. 597,311, filed Aug. 8, 1975. Also it should be understood that since the above shown and described embodiments represent only few of its many possible configurations that this invention may assume, they are presented only as illustrative of the broad scope of this concept only and that numerous omissions, changes and additions may be made in these embodiments without departing from the spirit and scope of the attached claims.

What I claim is:

1. In combination a coupling structure to operatively couple a sidecar to existing two-wheel tandem-type land vehicle, the structure comprising plural, rigid and torsionally resilient connecting members, each bent to form a longer mid-portion and two shorter end-portions; their longer mid-portions positioned substantially horizontally and transversely between the two-wheel vehicle and the sidecar, their shorter end-portions on one side aligning with and operatively attached at two points to rigid structural members of said two-wheel vehicle and their shorter end portions at the opposite side attached to rigid structural members of said sidecar.

2. The structure of claim 1, wherein the longer mid-portions of said connecting members are configured to serve as conventional torsion-bar type of suspension means between said two-wheel vehicle and said sidecar, their shorter end-portions serving as anchor means for their mid-portions and alternately assuming functions of a conventional lever control arms and a fixed means of attachment for them.

3. The structure of claim 1, wherein said connecting members are configured of rigid tubular means.

4. The structure of claim 2, wherein said connecting members are configured of non-metalic materials.

5. The structure of claim 1, wherein said shorter end-portions of said connecting members are bent at such angles and in such directions from their longer mid-portions as required to match the angle and direction of the rigid structural parts to which they are operatively attached.

6. The structure of claim 1, wherein said shorter end-portions are attached by spaced apart bolt means of predetermined, uniform distance between them.

7. The structure of claim 1, wherein one of said connecting members is configured to serve as a support for the axle of said sidecar wheel.

8. The structure of claim 7, wherein one of said connecting members is of tubular configuration and its outboard end is configured to insertably accept separate, specifically configured axle means within it, including means to secure it therein and allowing easy replacement of it.

9. The structure of claim 7, wherein said one connecting member is of solid rod configuration and its outboard end is configured to serve as an axle means for the wheel of said sidecar.

10. The structure of claim 1, wherein the shorter end-portion of one of said connecting members supports one side of the axle means of the wheel of said sidecar.

11. The structure of claim 1, wherein one of said connecting members has one of its shorter end-portions configured to support an outboard side of an axle means of said sidecar wheel.

12. The structure of claim 11, comprising an auxiliary wheel-stay means secured to the longer mid-portion of said connecting member and the inboard side of the axle of said sidecar wheel.

13. The structure of claim 10, comprising an auxiliary wheel-stay means secured to said shorter end-portion on one end and modified to support the other side of the axle means of said sidecar by its other end.

14. The structure of claim 10, comprising auxiliary wheel-stay means secured to the rigid structural portion of said sidecar on one end and to the other side of said axle means on the other end.

15. The structure of claim 2, wherein one of said connecting members comprises a torsion-bar suspension means for said sidecar wheel.

16. The structure of claim 10, wherein said shorter end-portion is configured into a two-pronged fork-type support for the wheel of said sidecar.

17. The structure of claim 15, wherein the shorter end-portion of said connecting member approaches the wheel axle of said sidecar from either front or back angular direction and from above or below the axle height of said wheel.

18. The structure of claim 3, wherein said shorter end-portions of said connecting members are secured to the main vehicle by bolts with sleeves.

19. The structure of claim 3, wherein said shorter end-portions of said connecting members are secured to rigid structural members of said main vehicle by means of modified collar-and-bolt means.

20. The structure of claim 1, comprising means to control the proper "toe-in" of said sidecar wheel.

21. The structure of claim 6, wherein the bolt holes in the inboard facing side of said shorter end-portions of said connecting members are elongated in transverse direction to their longitudinal center line.

22. The structure of claim 21, wherein said bolt holes are transversely elongated through both sides of said shorter end portions.

23. The structure of claim 21, comprising resilient inserts to fit tightly into said tubular shorter end-portions; a hole in each one to tightly accept said bolts.

24. The structure of claim 23, wherein said resilient inserts are configured in two longitudinal halves, separated by two rigid plates modified to accept said attaching bolts between them.

25. The structure of claim 3, wherein the existing two-wheel vehicle is a bicycle, said sidecar is connected to it by three connecting members, their shorter end-portions on one side longitudinally alligned with and operatively attached to the three frame tubes radiating from the crank-housing of said bicycle frame and operatively attached to them at two spaced-apart points located as far away from said crank-housing as practically possible; their opposite shorter end-portions operatively secured to correspondingly positioned rigid components of said sidecar by bolts.

26. The structure of claim 25, wherein two of said connecting members are configured to support the axle of said sidecar wheel.

27. The structure of claim 25, wherein the outboard shorter endportions of all three connecting members supporting said sidecar converge toward the axle of its wheel.

28. The structure of claim 25, wherein the back lower connecting member has its outboard end configured straight to serve as the support for the inboard end of the axle of said sidecar wheel.

29. The structure of claim 28, wherein the end of said back lower connecting member is configured to allow easy "drop-out" mode of removal and remounting of said sidecar wheel.

30. The structure of claim 29, wherein said end of said back lower connecting member is split longitudinally on its bottom side, the split portions flared downwardly to form an enclosure opened on its bottom and configured to accept and secure within it the inboard end of axle means of said sidecar wheel.

31. The structure of claim 25, wherein the connecting member secured to the seat-tube of said bicycle has its opposite shorter end-portion modified to be secured to a regular bicycle front-wheel fork but facing rearwardly to support said sidecar wheel.

32. The structure of claim 1, wherein said connecting members comprise additional bends to properly line up with rigid structural members of said sidecar.

33. The structure of claim 1, wherein said connecting members are secured to the outboard side of said sidecar, its inboard side supported by auxiliary means secured to the longer mid-portion of said connecting members.

34. The structure of claim 1, wherein said existing vehicle is of the motorcycle type configuration, said shorter end-portions of said connecting members secured to substantially horizontal and longitudinally extending rigid frame members.

35. The structure of claim 1, wherein those connecting members attached to the upper portions of the main vehicle comprise means to make their overall transverse length variable.

36. The structure of claim 35, wherein said connecting members are configured in two sections, their respective lengths of the mid-portion modified to be operatively slidable within each other.

37. The structure of claim 36, comprising adjustable and secured means to control the range of the slidable movement between the two sections of said connecting members.

38. The structure of claim 36, wherein said connecting members are of tubular configuration, their modified mid-portions formed into square cross-sectional configurations for slidable cooperative engagement with each other.

39. The structure of claim 36, wherein said connecting members are of solid rod configuration, end of one mid-portion section locally changed into square cross-sectional configuration, the other mid-portion section configured into square sleeve means to allow the two ends to be operatively slidable within each other.

40. The structure of claim 1, wherein the outboard side of said sidecar is supported by the outboard shorter end-portions of said connecting members, its inboard side supported by their longer mid-portions by resting on them and operatively secured to them by means which do not affect the resiliency of said connecting members.

41. The structure of claim 1, comprising means allowing the "tow-in" adjustment for the sidecar wheel.

42. The structure of claim 1, wherein said sidecar has its own axle means, secured to its outboard structural side member at a fixed location, but to its inboard structural member by toe-in adjustment means.

43. The structure of claim 1, comprising means to prevent the bottom surface of the front portion of said sidecar from unwanted contact with the road surface during the operation of such vehicle.

44. The structure of claim 1, wherein the left and right structural sides of said sidecar are interconnected by transverse members configured in the manner of said transverse members connecting said sidecar to said two-wheel vehicle.

45. The structure of claim 1, wherein said vehicle is a mini-bike type of two-wheel vehicle.

46. The structure of claim 1, wherein said vehicle is a pedal and motor assisted two-wheel vehicle.

47. The structure of claim 1, wherein said sidecar structure is configured to transport commercial and human cargoes individually and in any combination of them, comprising enclosures, covers and body panels to provide protection from elements and pilferage for such cargoes.

48. The structure of claim 1, comprising auxiliary spring means between the wheel and said sidecar to approximate the roadability of said sidecar to the roadability of said two-wheel vehicle.

49. The structure of claim 34, comprising two sidecar structures, one on each side of said two-wheel vehicle, each mounted independently of the other, each usable singly, each adopted for cargo and passengers.

50. The structure of claim 1, comprising an auxiliary swivel-type wheel secured to a forward outboard corner of said sidecar.

51. The structure of claim 1, wherein said sidecar structure is formed only from said connecting members.

52. The structure of claim 1, wherein said operatively coupled sidecar is a common type two-wheel hand cart, tote cart, shopping cart and the like, with its wheels positioned in transverse alignment with the back wheel of said tandem type-vehicle.

53. The structure of claim 1, wherein the upper connecting member positioned closest and above said sidecar wheel comprises wheel fork means.

54. The structure of claim 7, werein said sidecar wheel is maintained in the desired position by means of horizontal wheel stay means secured to the rigid structure of said sidecar at one end, its other end adapted to be secured to the outboard end of the axle of said sidecar wheel.

55. The structure of claim 34, comprising "toe-in" adjustment means to control the amount of "toe-in" of said sidecar wheel.

56. The structure of claim 1, wherein said sidecar comprises its own transverse two-wheel axle means, thus permitting it to be used interchangeably as a cart, a trailer and a sidecar.

57. The structure of claim 56, wherein said two-wheel axle is secured to the inboard side of said sidecar structure in adjustable manner to provide means of proper "toe-in" adjustment for the outboard wheel when it is supporting said sidecar.

58. The structure of claim 1, wherein said sidecar structure is configured of wire, rod and tubing components to minimize its wind resistance, including easily attachable, soft, semi-rigid and rigid means to provide protection for its occupants and cargo.

59. The structure of claim 1, comprising means on said side car to locate and install passenger restraining devices and cargo tethering means.

60. The structure of claim 1, wherein said sidecar is configured as an open cargo carrier, further comprising means to secure such cargoes to its structural members.

61. The structure of claim 1, wherein the exterior body shell of said sidecar is configured of molded synthetic materials forming a fully enclosable weather and pilfer-proof travel capsule when closed; configured to accommodate assorted cargo as well as people in varied combinations; comprising foldable, removable and adjustable seats, wind-screens and protective tops.

62. The structure of claim 1, wherein said sidecar comprises rigid frame structure over which are installable and removable soft, semi rigid and rigid panels and enclosures made of synthetic materials.

63. The structure of claim 1, comprising foldable steps, assist bars and collision deflecting means secured to the rigid structure of said sidecar.

64. The structure of claim 1, wherein said connecting members differ in their relative transverse length in sufficient amounts to provide proper "lean-out" and sufficient "camber" between the wheels of the main vehicle and the wheel of said sidecar.

* * * * *